(12) United States Patent
Ramakrishnan

(10) Patent No.: US 7,171,376 B2
(45) Date of Patent: Jan. 30, 2007

(54) METHODS AND APPARATUS FOR INVENTORY ALLOCATION AND PRICING

(75) Inventor: Vishwamitra S. Ramakrishnan, Belmont, MA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 10/891,458

(22) Filed: Jul. 14, 2004

(65) Prior Publication Data

US 2005/0060270 A1 Mar. 17, 2005

Related U.S. Application Data

(60) Provisional application No. 60/487,546, filed on Jul. 15, 2003.

(51) Int. Cl.
*G06F 9/44* (2006.01)
*G06F 17/50* (2006.01)

(52) U.S. Cl. .............................. 705/10; 705/1; 705/14; 705/26; 705/28

(58) Field of Classification Search ................... 705/1, 705/28, 10
See application file for complete search history.

(56) References Cited

U.S. PATENT DOCUMENTS

| 5,237,496 A | 8/1993 | Kagami et al. |
| 5,237,498 A | 8/1993 | Tenma et al. |
| 5,450,314 A | 9/1995 | Kagami et al. |
| 5,758,328 A | 5/1998 | Giovannoli |

(Continued)

FOREIGN PATENT DOCUMENTS

WO    WO 2003054759 A2 * 7/2003

OTHER PUBLICATIONS

Profitlogic.com.*

(Continued)

*Primary Examiner*—John W. Hayes
*Assistant Examiner*—Freda A. Nelson
(74) *Attorney, Agent, or Firm*—Chapin IP Law, LLC; Barry W. Chapin, Esq.

(57) ABSTRACT

The invention provides methods of, and systems for, optimizing the allocation of inventory to, and pricing of, goods sold by multiple retail sites, e.g., in a store, chain or other retail enterprise. Such a method includes generating a plurality of possible or "candidate" allocations of a given inventory among the multiple retail sites. That inventory can be, for example, a supply of the same or like goods at a distribution center that serves the retail sites. Each candidate allocation comprises an assignment of a respective share of that inventory to each of the sites. For each of the candidate allocations, an optimal price of the goods at each of the retail sites is estimated. The optimal price is one that will return an optimal gross margin to the respective site, given its assignment of the respective share of the inventory for the particular candidate allocation. For each of the candidate allocations, a sum is determined of the optimal gross margins across all the retail sites. From substantially all possible allocations, the candidate allocation that results in a largest total optimal gross margin is efficiently chosen.

23 Claims, 5 Drawing Sheets

U.S. PATENT DOCUMENTS

| | | | |
|---|---|---|---|
| 5,765,143 | A | 6/1998 | Sheldon et al. |
| 5,822,736 | A | 10/1998 | Hartman et al. |
| 5,933,813 | A | 8/1999 | Teicher et al. |
| 5,963,919 | A | 10/1999 | Brinkley et al. |
| 5,974,396 | A | 10/1999 | Anderson et al. |
| 5,983,224 | A | 11/1999 | Singh et al. |
| 5,987,425 | A | 11/1999 | Hartman et al. |
| 6,006,196 | A | 12/1999 | Feigin et al. |
| 6,009,407 | A | 12/1999 | Garg |
| 6,029,139 | A | 2/2000 | Cunningham et al. |
| 6,061,691 | A | 5/2000 | Fox |
| 6,078,900 | A * | 6/2000 | Ettl et al. ............... 705/28 |
| 6,092,049 | A | 7/2000 | Chislenko et al. |
| 6,151,582 | A | 11/2000 | Huang et al. |
| 6,205,431 | B1 | 3/2001 | Willemain et al. |
| 6,230,150 | B1 | 5/2001 | Walker et al. |
| 6,253,187 | B1 | 6/2001 | Fox |
| 6,293,866 | B1 | 9/2001 | Walker et al. |
| 6,306,038 | B1 | 10/2001 | Graves et al. |
| 6,308,162 | B1 | 10/2001 | Ouimet et al. |
| 6,324,522 | B2 * | 11/2001 | Peterson et al. ............ 705/28 |
| 6,328,648 | B1 | 12/2001 | Walker et al. |
| 6,331,144 | B1 | 12/2001 | Walker et al. |
| 6,341,269 | B1 | 1/2002 | Dulaney et al. |
| 6,366,890 | B1 * | 4/2002 | Usrey ..................... 705/10 |
| 6,397,166 | B1 | 5/2002 | Leung et al. |
| 6,397,197 | B1 | 5/2002 | Gindlesperger |
| 6,493,678 | B1 | 12/2002 | Foster et al. |
| 6,496,834 | B1 | 12/2002 | Cereghini et al. |
| 6,520,856 | B1 | 2/2003 | Walker et al. |
| 6,553,352 | B2 | 4/2003 | Delurgio et al. |
| 6,834,266 | B2 * | 12/2004 | Kumar et al. ............... 705/10 |
| 7,085,734 | B2 * | 8/2006 | Grant et al. ............... 705/20 |
| 2001/0014868 | A1 | 8/2001 | Herz et al. |
| 2001/0044766 | A1 | 11/2001 | Keyes |
| 2001/0047293 | A1 | 11/2001 | Waller et al. |
| 2002/0022985 | A1 | 2/2002 | Guidice et al. |
| 2002/0029176 | A1 | 3/2002 | Carlson et al. |
| 2002/0072977 | A1 | 6/2002 | Hoblit et al. |
| 2002/0143669 | A1 * | 10/2002 | Scheer ..................... 705/28 |
| 2002/0147630 | A1 * | 10/2002 | Rose et al. ............... 705/10 |
| 2002/0174119 | A1 | 11/2002 | Kummamuru et al. |
| 2003/0028437 | A1 | 2/2003 | Grant et al. |
| 2003/0046127 | A1 | 3/2003 | Crowe et al. |
| 2003/0101107 | A1 * | 5/2003 | Agarwal et al. ............ 705/28 |
| 2003/0195791 | A1 * | 10/2003 | Waller et al. ............. 705/10 |
| 2003/0229502 | A1 * | 12/2003 | Woo ....................... 705/1 |

OTHER PUBLICATIONS

Evant.net.*

David, Mahoney, "Crate&Barrel", Apr. 2001, Modern Materials Handling, v56, n4, p. 42.*

Achabal et al., A Decision Support System for Vendor Managed Inventory, Winter 2000, Journal of Retailing, vol. 76, No. 4, p. 430.

"Fair Market to Take Guesswork Out of Sale Pricing With New Performance-Based Markdown Engine; Major Step in Online Selling to Help Merchants Maximize Margin," Business Wire, May 21, 2001. (3 pages).

SAS Institute Software, www.sas.com (Jun. 1998) pp. 1-7.

SAS/STAT User's Guide, Version 8 (SAS Publishing: 1999), pp. 1-129.

Ackerman, Jerry, "Looking Back to Fashion's Future," The Boston Globe, Oct. 7, 1998[retrieved Jan. 7, 2003], 3 pages, retrieved from: archive.org and Google.com.

Datz, Todd, "Pythagorean Pantsuits-Modeling Merchandise," *CIO Magazine*, Feb. 15, 1999 [retrieved Jan. 7, 2003], 1 page, retrieved from archive.org and google.com.

"Gymboree Selects TSI to Design and Implement Inventory Optimization and Pricing Solution," TSI Press Release, Jan. 13, 1999 [retrieved Jan. 7, 2003], 2 pages, retrieved from: google.com and archive.org.

Koloszyc, Ginger, "Merchants Try Complex Mathematical Tools to Improve Inventory Decisions," *Stores Magazine*, Nov. 1998 [retrieved Jan. 7, 2003], 3 pages, retrieved from google.com and archive.org.

Levy, Michael R. and Woo, Jonathan, Ph.D. "Yield Management in Retail: The Application of Advanced Mathematics to the Retail Pricing Dilemna," TSI (Marketing Materials), 1999.

Makridakis, Spyros, et al., "Forecasting," copyright 1997, John Wiley & Sons, Inc., pp. 312, 373-374.

Merritt, Jennifer, "Company makes Science out of Shopping Trends," *Boston Business Journal* Sep. 3, 1998 [retrieved on Jan. 7, 2003], 3 pages, retrieved from google.com and archive.org.

Screenshots of Technology Strategy, Inc., www.grossprofit.com, Mar. 2, 2000 [retrieved on May 29, 2003], 9 pages, retrieved from: Google.com and archive.org.

Smith, Stephen A. and Achabal, Dale D. "Clearance Pricing and Inventory Policies for Retail Chains," Management Science 44:3 (Mar. 1998), pp. 285-300.

"Special Feature: Alliances of Accenture, ProfitLogic team helps retailers enhance sales," *Businessworld* (Feb. 5, 2001).

Technology Strategy, Inc., company marketing materials, copyright 1991, Technology Strategy, Inc.

Technology Strategy, Inc., company marketing materials, copyright 1998, Technology Strategy, Inc.

"Technology Strategy, Inc. Names Jonathan Woo as Director of R&D," TSI Press Release, Jul. 15, 1998 [retrieved Jan. 7, 2003], 1 page, retrieved from google.com and archive.org.

"Wal-mart: Retailer of the Century: High-Tech Complements Human Touch," *Discount Store News* Oct. 11, 1999 [retrieved Jun. 26, 2002], 3 pages, retrieved from:www.lexus.com.

Wang, Qinan and Wu, Zhang, "Improving a supplier's quantity discount gain from many different buyersm," *IEE Transactions* vol. 32 (2000) pp. 1071-1079.

John A. Rice. "Mathematical Statistics and Data Analysis, Second Edition," *Duxbury Press*.

Eamonn J. Keogh & Michael J. Pazzani. "An Enhanced Representation of Time-Series which Allows Fast and Accurate Classification, Clustering and Relevance Feedback". *Fourth Conference on Knowledge Discovery in Databases and Data Mining* (1998).

Eamonn J. Keogh & Padhriac Smyth. "A Probabalistic Approach to Fast Pattern Matching in Time Series Databases". *Proceedings of the Third Conference in Knowledge Discovery in Databases and Data Mining* (1997).

Rakesh Agrawal, King-lp Lin, Harpreet S. Sawhney, Kyuseok Shim. "Fast Similarity Search in the Presence of Noise, Scaling, and Translation on Time-Series Databases". *VLDB* pp. 409-501 (1995).

Eamonn J. Keogh & Michael J. Pazzani. "Relevance Feedback Retrieval of Time-Series Data". 22nd *International ACM-SIGIR Conference on Research and Development in Information Retrieval* (1999).

Praveen K. Kopalle et al. "The Dynamic Effect of Discounting on Sales: Empirical Analysis and Normative Pricing Implications". *Marketing Science* 317-332 (1999).

Jorge M. Silva-Risso et al. "A Decision Support System for Planning Manufacturers' Sales Promotion Calendars". *Marketing Science*, pp. 274-300 (1999).

Gafney, Scott & Padhriac Smyth. "Trajectory Clustering with Mixtures of Regression Models". *Proceedings of the ACM SIGKDD International Conference on Knowledge Discovery and Data Mining* (1999).

Eamonn J. Keogh. "A Fast and Robust Method for Pattern Matching in Time-Series Databases". *Proceedings of WUSS* (1997).

A.K. Jain & R.C. Dubes. "Algorithms for Clustering Data". *Prentice-Hall* (1988).

* cited by examiner

METHODS AND APPARATUS FOR INVENTORY ALLOCATION AND PRICING

This application claims the benefit of priority of United States Provisional Patent Application Ser. No. 60/487,546, filed Jul. 15, 2003, entitled "Model for Optimizing In-Season Tactical Decisions," the teachings of which are incorporated by reference herein.

BACKGROUND OF THE INVENTION

The invention pertains to digital data processing and, more particularly, to methods and apparatus for optimizing inventory allocations and pricing for goods sold by multiple retail sites, e.g., retail stores and/or departments. The invention has application, by way of non-limiting example, in facilitating in-season tactical decisions by retail chains and other enterprises.

In current practice, retail enterprises (e.g., national or regional retail chains) handle in-season allocations of on-hand inventory at distribution centers (DCs) to retail sites (e.g., stores or departments) in a simple way based on the sites' own respective on-hand inventory positions and recent sales histories. This process typically involves (i) adding up the DC's on-hand inventory and the sites' on-hand inventory positions to get the total on-hand inventory; (ii) assigning that total inventory to each site in proportion to that site's recent sales history, e.g., the last four weeks of sales (for example, a site that sold a large amount of inventory during the last four weeks will be assigned a large share of the total inventory); and (iii) adjusting this assignment with each site's on-hand inventory position. If a site's on-hand inventory is more than its assigned inventory (as determined in step (ii)), no additional inventory is allocated to that site. If it is less, the difference between the assigned and on-hand amounts is sent to the site.

More sophisticated systems handle in-season allocations differently: they may use a forward four-week sales forecast (as opposed to the last four weeks' of sales) to divide up the total inventory. Regardless, the in-season allocation decisions made by these prior art systems do not take sufficient account of the retail sites' ability to sell or otherwise dispose of inventory that is allocated to them via appropriate pricing actions.

An object of this invention is to provide improved methods and apparatus for facilitating in-season tactical decisions in retailing.

A more particular object is to provide such methods and apparatus to facilitate inventory allocations among retail sites (e.g., stores and/or departments) within a retail enterprise.

A related object is to provide such methods and apparatus to take into account the retail sites' varying ability to sell or otherwise dispose of inventory that is allocated to them.

Another related object is to provide such methods and apparatus to facilitate pricing decisions in connection with inventory allocation.

Still another object is to provide such methods and apparatus as can be readily implemented in existing and future business process systems, automated or otherwise.

SUMMARY OF THE INVENTION

The foregoing objects are among those attained by the invention which provides, in some aspects, a method of optimizing the allocation of inventory and pricing of goods sold by multiple retail sites (e.g., stores and/or departments) in a store, chain or other retail enterprise.

Such a method, according to one aspect of the invention, contemplates generating a plurality of possible or "candidate" allocations of a given inventory among the multiple retail sites. That inventory may be, for example, a supply of the same or like goods at a distribution center that serves the retail sites. Each candidate allocation comprises an assignment of a respective share of that inventory to each of the sites.

For each of the candidate allocations, an optimal price of the goods at each of the retail sites is estimated. The "optimal" price is one that will return an optimal gross margin (that is, a highest gross margin) to the respective site, given its assignment of a respective share of the inventory for the particular candidate allocation. The method also determines, for each of the candidate allocations, a sum of the optimal gross margins across all the retail sites. From this, the method chooses as the "best" candidate allocation, i.e., that which results in a largest total of all optimal gross margin across all sites.

A report is generated, according to one aspect of the invention, showing the candidate allocation and, particularly, one or more of the sites' respective assigned shares under that allocation. The report can likewise show the optimal prices determined for those share assignments.

Related aspects of the invention provide a method as described above in which the candidate allocations that are generated and used for estimating the optimal pricing comprise substantially all possible candidate allocations of the given inventory. This is achieved, according to some practices of the invention, by use of an optimization tool—for example, one that utilizes a non-linear programming model. Such a tool can be used to choose the allocation that results in a largest sum total optimal gross margin across all of the sites.

Other aspects of the invention provide methods as described above in which one or more of the per-site shares assigned under the chosen allocation and/or the corresponding per-site optimal pricing are used to effect picking, distribution and/or stocking of actual inventory to the retail sites, e.g., via communication with manual and/or automated inventory distribution systems.

Still other aspects of the invention provide methods as described above in which the estimation of each site's optimal pricing takes into account, not only a share of the candidate allocation of inventory, but also the price elasticity of the goods, the seasonality of the goods and/or the cost of the goods. Yet still other aspects of the invention provide such methods in which the optimal per-site pricing is determined from the sum of (i) inventory already on-hand at that site (or otherwise previously allocated to that site) and (ii) that site's share of the candidate distribution.

Still further aspects of the invention provide methods as described above in which the estimation of optimal price at which the goods can be sold by a retail site is determined in accord with the relation:

$$MarkdownPrice = \left(\frac{B \times Seas}{OH + Alloc}\right)^{\frac{1}{Elas}} \times InitP$$

where,

Mark down Price is an estimate of the optimal price of the goods at the retail site;

B is the rate of sale of the goods at the initial price;
Seas is a sum of the seasonality indexes for the goods over the planned selling period at the retail site;
OH is the inventory of goods on-hand at the retail site;
Alloc is a quantity of goods in the share (of the total inventory) assigned to the retail site;
Elas is the price elasticity of the goods;
InitP is the initial price of the goods.

Yet still other aspects of the invention provide systems configured and operating in accord with the methods above. These and other aspects of the invention are evident in the drawings and in the text that follows.

BRIEF DESCRIPTION

A more complete understanding of the invention may be attained by reference to the drawings, in which.

DETAILED DESCRIPTION OF THE ILLUSTRATED EMBODIMENT

Figure 1:
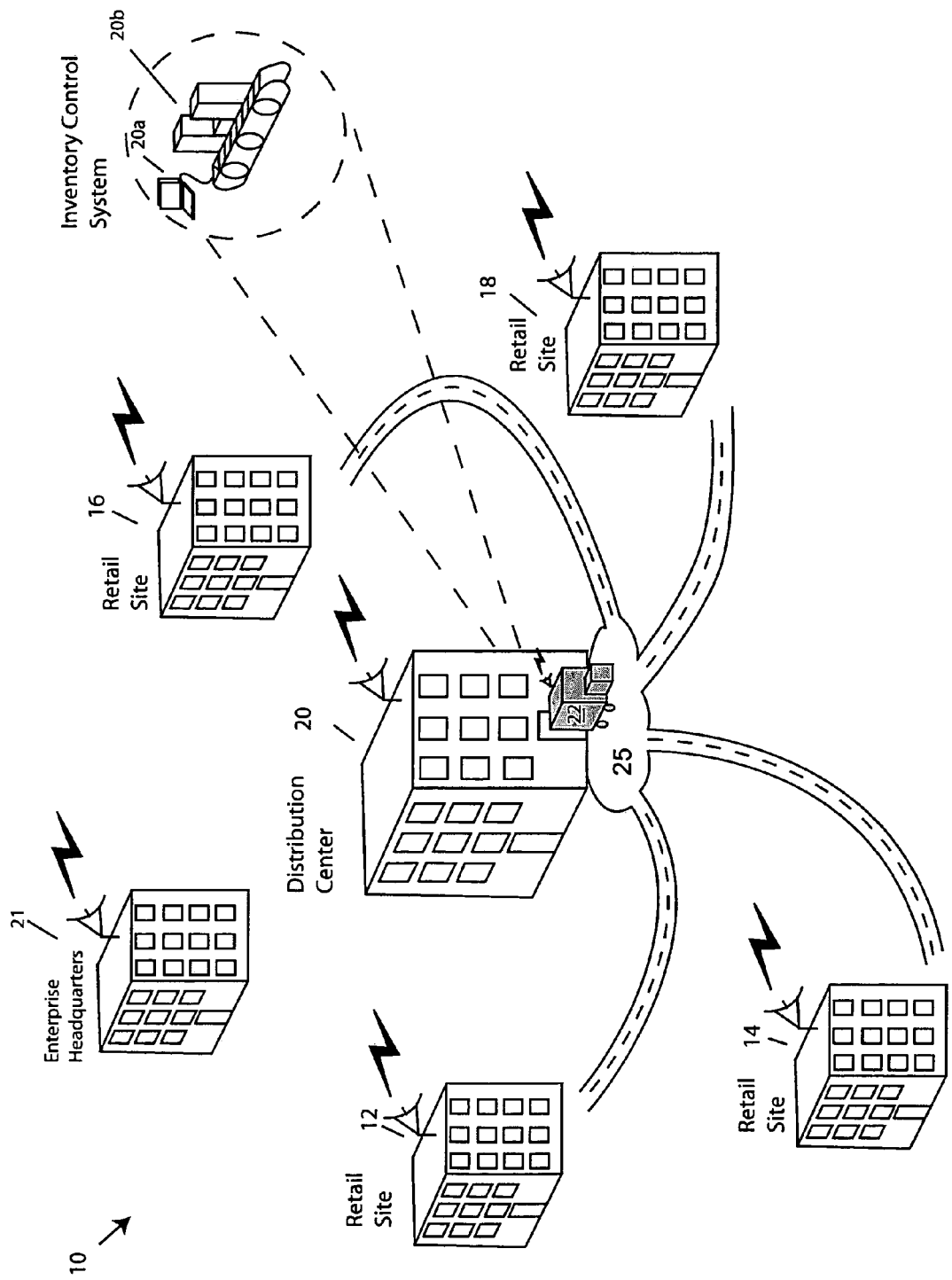
FIG. 1 depicts a physical environment 10 in which the invention is practiced.

FIG. 1 depicts a physical environment 10 in which the invention is practiced. In the illustrated embodiment, that environment is a retailing enterprise of international, national, local (or other) scale comprising retail sites 12–18, inventory distribution center (DC) 20 and enterprise headquarter 21. That retailing enterprise (in this case, retail stores) can be a "chain" of commonly named and owned stores, though, it may be a looser (or tighter) collection of related stores, that are presumably (though not necessarily) under common control or management. Moreover, although the retail sites depicted and discussed here are stores, they may also be departments or other retail outlets (physical, virtual, online, or otherwise).

Illustrated retail sites 12–18 are conventional (or non-conventional) retail outlets, such as, by way of non-limiting example, clothing stores, department stores, jewelry stores, furniture stores, beauty supply shops, consumer electronics stores, and so forth. These sites maintain separate inventories which may be stored on-hand and/or, optionally, in an associated warehousing facility (not shown), e.g., nearby to each respective retail site.

In the discussion that follows and without loss of generality, such inventory is referred to as "on-hand" at a particular site, regardless of whether it is actually maintained at that site or at another retail site (or warehousing facility), e.g., within the same region or "zone," with which it exchanges inventory. Inventory stored at the distribution center 20 is not deemed on-hand to any of the sites, except the distribution center itself.

Distribution center 20 maintains inventory for in-season distribution to the retail sites 20a–20b. That inventory can be distributed to the retail sites 20a–20b via overland carrier, here, represented by truck 22 and roads 25, or via other means, such as via airways or waterways, or, depending on the nature of the goods, electronically. Though only one distribution center 20 is shown in the drawing, it will be appreciated that the invention has equal application in embodiments having multiple distribution centers.

To simplify the discussion that follows, the inventory stocked by distribution center 20 inventory is assumed to comprise only "similar" goods—i.e., goods of a single brand, style, size and color (e.g., mens' navy-colored Levi's® 517® loose boot cut jeans, waist 34, length 30). In this regard, the optimization workstation 28 (FIG. 2) discussed below determines optimum in-season inventory allocation and markdown pricing of such "similar" goods to and by the retail sites 12–18. That optimum allocation and pricing is one that maximizes total gross margin to the retail enterprise (e.g., chain) for the sale (or other disposal) of those similar goods by the retail sites 12–18. In embodiments where the distribution center 20 stocks many varieties of goods, the optimization workstation 28 likewise, but separately, determines optimum in-season inventory allocation and/or markdown pricing for each other group of "similar" goods stocked by the DC 20.

Enterprise headquarters 21 represents any facility and/or functionality from which inventory allocation and/or pricing decisions are made. Though illustrated as being housed in a separate facility in the drawing, that headquarters may be cohoused and/or coextensive with one or more of the retail sites 12–18 and/or distribution center 20.

In the illustrated embodiment, the locations 12–21 are electronically linked for the transfer of information as indicated by the satellite dishes depicted atop the respective facilities. In practice, the transfer of information between and amongst locations 12–21 may take place over any number of electronic and/or physical media known in the art, e.g., by way of non-limiting example, wireless and/or wired transmission over a WAN, Internet or other network 24, as shown in FIG. 2.

Figure 2:
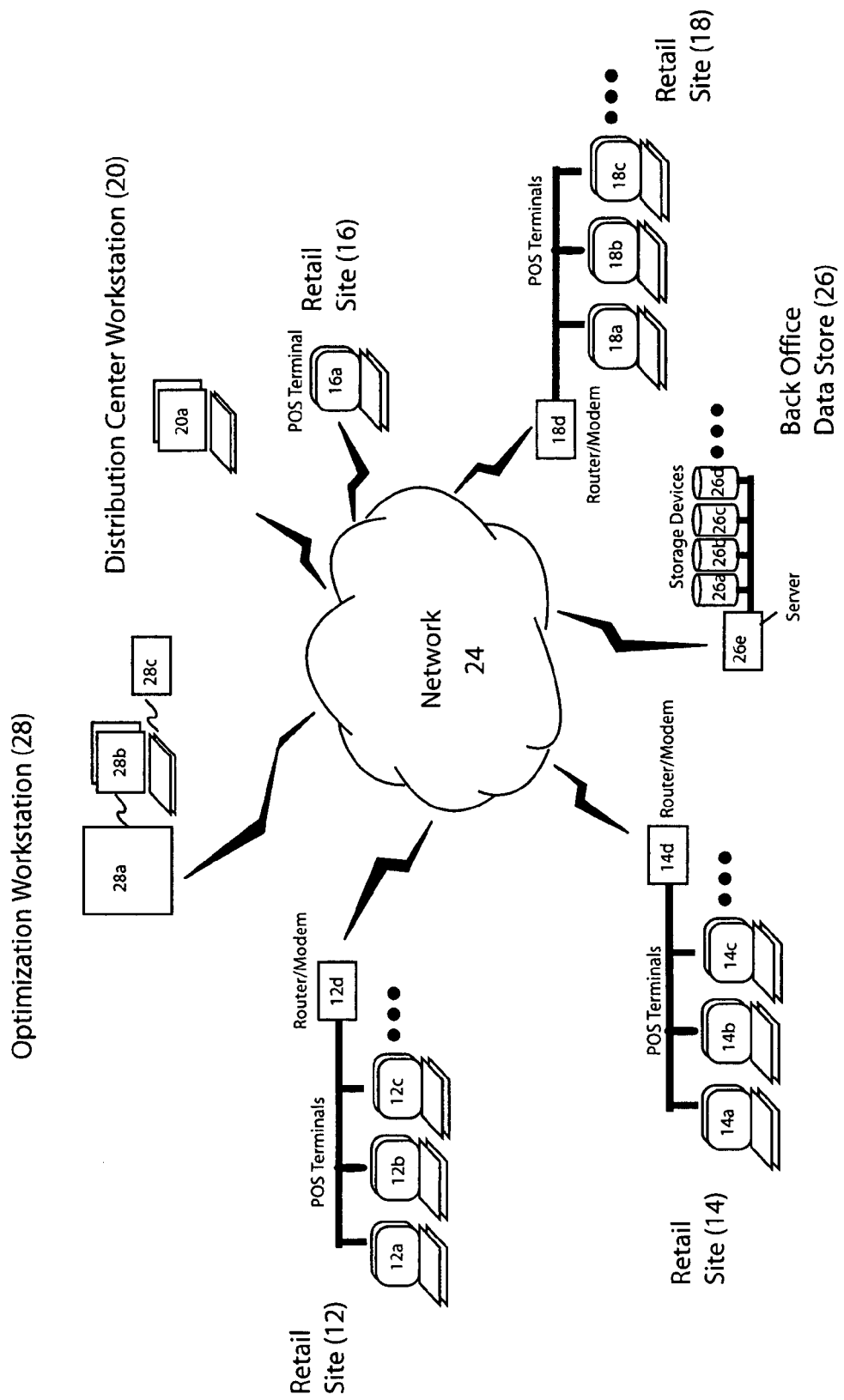
FIG. 2 depicts a digital data processing environment in which the invention is practiced.

More particularly, FIG. 2 depicts a digital data processing environment 10 in which the invention is practiced. Here, the aforementioned information transfer is shown taking place over network 24, though, in practice other media can be used instead or in addition. Referring to the drawing, each retail site 12–18 includes one or more interconnected point of sale (POS) terminals 12a–18c. These provide for inventory tracking, as well as for pricing and collection of monies from retail patrons at the time of sale. Though POS terminals are used for these purposes in the illustrated embodiment, it will be appreciated that in other embodiments these functions may be exercised by other mechanisms known in the art, automated or otherwise.

Distribution center 20 is includes a workstation 20a that tracks inventory at the center. This can be a personal computer, mainframe, other digital data processor or apparatus of the type known in the art for inventory tracking, as adapted for communication with optimization workstation 28, e.g., via a router, modem or other communications device (not shown), for practice of the inventions described herein. As shown in FIG. 1, that workstation can form part of an automated inventory control system 20b.

Back office data store 26 represents a repository of inventory and sales information from retail sites 12–18, as well as inventory information from DC 20. This may be part of a general back office management function, e.g., that additionally includes overall corporate financial tracking and management, or otherwise. In the illustrated embodiment, the store 26 comprises storage devices 26a–26d, which are coupled to network 24, via server and/or data-base management system 26e. Information regarding inventory and sales therefrom is communicated from the POS terminals in each of the sites 12–18 to data store 26 via router/ modems 12*d*, 14*d*, 16*d*, 18*d* and network 24. Inventory information is likewise communicated from the DC workstation 20*a*, as discussed above, via network 24. Of course, in other embodiments information may be communicated among back office store 26, sites 12–18 and DC 20 by other means. And, in some embodiments, data store 20 may be contained in or obtained from other, multiple and/or distributed sources.

Optimization workstation 28 comprises a personal computer, workstation, mainframe or other digital data processing system of the type commonly available in the marketplace, as programmed in accord with the teachings hereof for optimizing in-season inventory allocations and/or markdown pricing as among DC 20 and retail sites 12–18. The workstation 28 comprises processor section 28*a* (comprising a central processing unit, dynamic storage, input/output control, and the like), a monitor, keyboard and other user input/output devices 28*b*, and printers or other output devices 28*c*, networked or otherwise—again, all of the type commercially available in the marketplace. The workstation 28 can be coupled for communications with back office data store 26, via network 24 or otherwise, to gather sales and inventory information from sites 12–18 and DC 20. Workstation 28 uses that information to determine optimal inventory allocations and/or pricing (as described below), to print reports for review and implementation by personnel acting on the enterprise's behalf, and/or to directly implement optimal allocation and/or pricing conclusions.

As noted previously, in the prior art, in-season tactical decisions relating to allocations and markdowns are made independently. This leads to significant loss in gross margin, e.g., because the allocation system and the markdown system may compensate for site-level performance in inconsistent ways.

Take, for example, a chain that utilizes chain-wide markdown pricing that is independent of allocation. If the pricing system, detects poor chain-wide sales performance of an item, it may effect (or recommend) an immediate chain-wide discount on that item in order to stimulate sales. When the allocation system detects high rates of sale (ROS) on that item by certain sites in the chain, it may effect (or recommend) an immediate allocation of inventory to those sites—notwithstanding that the recent markdown triggered the high ROS for some of these sites. In other words, the allocation system will not distinguish between sites with a high ROS caused by high "natural" demand and sites that have a high ROS due to "markdown induced" demand. For another example, a site may have a high ROS (in total) over the last 4 weeks, but this high total may mask the fact that the most recent one or two weeks may have been very slow. If this is the case, the pricing system would be likely to recommend a markdown very soon, leading to a situation where the allocation system is sending merchandise to stores that are about to take markdowns. The end result: the allocation system sends merchandise to the wrong sites.

Put another way, when the markdown and allocation systems act independently, "weak" stores get merchandise that should have gone to "strong" stores. Particularly, the weak stores get merchandise they should not have received in the first place, and they have to mark down it down to get rid of it. Further, when pricing is performed at the chain level, the strong stores have to mark down the merchandise, as well, even though they can move the merchandise without doing so. The end result is a loss of gross margin dollars.

If markdown pricing by the chain effected at the retail site level (or at some level below chain level), the mis-allocation problems caused by the independence of prior art markdown and allocation system are further exacerbated. In site-level pricing, prices (and therefore margins) may vary from site-to-site. However, since prior art allocation systems do not take margins into account, they may send more merchandise to low-margin stores and less merchandise to high-margin stores. This can be referred to as "margin leak." This is in addition to the consequences described above for the chain-level pricing case. In other words, even if the allocation system is smart enough to feed the strong sites and starve the weak sites, if it does not take margins into account, it may end up feeding low-margin strong stores at the expense of high-margin strong stores.

With respect to markdown pricing, prior art site-level pricing systems may make mark-down recommendations taking into account only site-level on-hand inventory positions. They do not take into account that inventory which the independent allocation system will recommend sending to the sites in the near future. The result may be a recommendation for no mark-down, even though a large shipment is due to arrive soon. When that happens, it may prove necessary to cut prices drastically to clear the merchandise.

These problems are avoided in systems according to the invention, which jointly optimize in-season allocations and markdowns taking into account, for example, (i) retail site-level (or zone-level) on-hand inventory positions, prices and margins, and (ii) on-hand inventory positions at the distribution center. Strong stores are allocated inventory instead of the weak stores so that they can sell it at higher margins. In the case of chain-level pricing, markdown recommendations are not triggered prematurely. While in the case of site-level pricing (or, again, when pricing is made at some level below the chain level), markdowns are made in conjunction with allocation decisions. In all cases, gross margin is optimized.

It will be appreciated that simply providing visibility from the allocation system into the markdown system, and vice versa, does not solve the problems raised by the prior art wholly satisfactorily due to a chicken-and-egg nature of the pricing and allocation problem. For example, knowing a big shipment will arrive next week at a retail site may help the mark-down system make a better recommendation for that store. However, it raises a further question: should the allocation system have even sent merchandise to that store in the first place?

The inventor has discovered that the correct way to solve this problem is to view allocation and markdown decisions as part of a single problem. This permits solutions that jointly optimize both decisions. To get some insight into this, the essence of the problem is demonstrated in the following example.

Assume a retail enterprise sells just one type of good and has two retail sites, A and B, each with some units of inventory on-hand selling at current prices that are, possibly, already marked down. Also assume that the sites take inventory from a single distribution center, with exactly one unit of the good in its on-hand inventory. The question is how to set the price of the good at the respective retail sites for the coming week and how to allocate the single unit of inventory (from the distribution center) between the sites so as to maximize total gross margin to the enterprise.

Option A is to allocate the single unit at the DC to retail site A. The optimal markdown required to maximize gross margin for each site is then independently determined, e.g., in the conventional manner known in the art. The sum total of those maximum gross margins is referred to as GM-A. Option B, alternatively, is to allocate the single unit at the DC to retail site B. Again, the optimal markdown required to maximize gross margin for each site is independently determined. The sum total of those gross margins is referred to as GM-B. In this simple example, if GM-A is greater than GM-B, Option A is selected as the one that optimizes enterprise gross margin. Otherwise, Option B is selected.

As evident here, given a specific allocation of distribution center inventory to the sites, solving the joint problem of allocation and pricing involves solving a markdown optimization problem for each site independently. Conceptually, this direct approach can be summarized as involving the following steps:

1. Listing all (or substantially all) possible allocations of DC inventory to the sites;
2. For every listed allocation:
   i. Independently determining, for each site, the markdown that optimizes the gross margin for that site;
   ii. Adding up the optimal gross margins across all sites to get the total enterprise gross margin for the given allocation.
3. Picking the allocation (and corresponding markdown determinations) that results in the highest total enterprise gross margin.

While the approach outlined above is conceptually sound, it glosses over a serious impediment to putting it into practice: the number of possible allocations (i.e., creating the list referred to in the very first step of the approach above) is large even for small problems. As an example, for a single distribution center with 100 units of on-hand inventory and ten stores, the number of possible allocations to the stores is over $10^{100}$ (i.e., 10 to the 100th power). More-over, for each of these allocations, it is necessary to determine ten times the markdown that optimizes the individual site gross margin (one determination for each of the stores). The problem is compounded as the size of the on-hand inventory at the distribution center, the number of retail sites served by the distribution center, and the number of different types of goods increases. For example, it is not uncommon for on-hand inventories at distribution centers to be in the hundreds of thousands and the number of retail sites served by a distribution center to be in the hundreds.

To overcome the impracticality of the direct approach described above but still attain the same objective, the inventor has realized a practical approach that can be effected in two steps:

1. Given a candidate allocation of inventory as between the retail sites, estimate the optimal markdown price recommendation—that is, the recommendation that maximizes gross margin for that site (given its share of the candidate allocation)—preferably, without extensive computation. Repeat this step, if and as necessary, to cover all desired candidate allocations.
2. Pick the candidate allocation from step 1 that maximizes the sum total gross margin for all sites without explicitly considering every possible candidate allocation. This implicit and efficient consideration of every possible candidate allocation is made possible by the use of advanced mathematical techniques.

Figure 3:
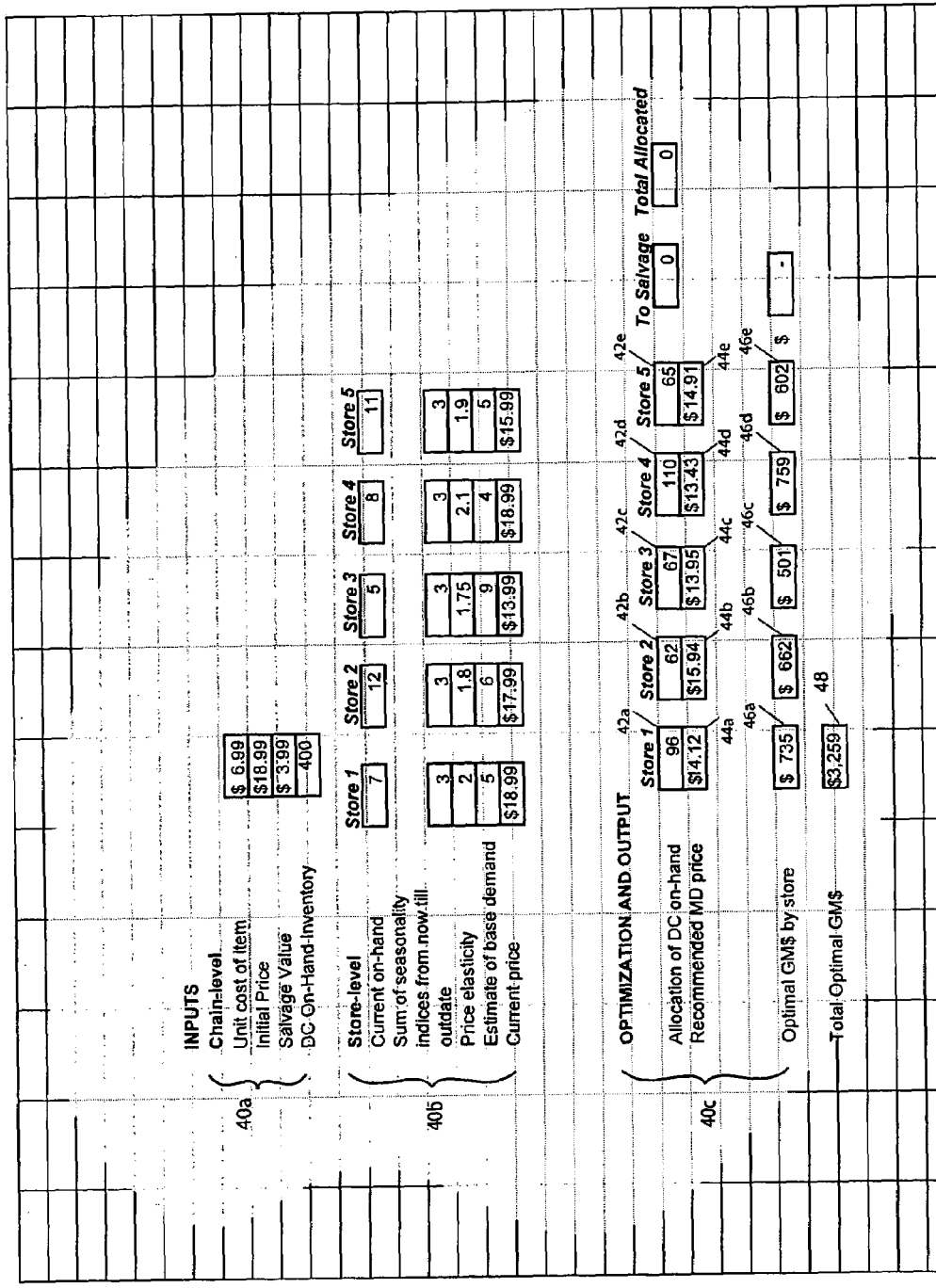
FIG. 3 depicts a spreadsheet-based embodiment of the invention.

FIG. 3 depicts an embodiment of the invention in accord with this approach. The embodiment comprises a Microsoft Excel spreadsheet 40, as described below, executing on optimization workstation 28 (FIG. 2). Those skilled in the art will appreciate that such spreadsheets provide a combined declarative and procedural programming platform and that other platforms (e.g., purely procedural, purely declarative, a combination thereof, or otherwise) can be used instead, or in addition, based on the teachings herein. In the drawing, selected cells of the spreadsheet are designated by dark rectangles and are discussed below.

The spreadsheet 40 includes a first input section 40a wherein retail chain-level specifics of the goods are provided. In the illustrated embodiment, this includes unit cost of the goods (here, labelled, "unit cost of item"), initial price of the goods, salvage value of the goods, and on-hand inventory at the distribution center (DC). Other embodiments may utilize greater or fewer chain-level inputs. As used in this paragraph, "chain" refers to any group of retail sites serviced by a common distribution center or centers. Depending on use, this may be an entire international, national, regional or local chain. It may also be a subset of such a chain. Values in section 40a may be supplied by the user or operator of workstation 28, they may also be supplied automatically, e.g., by batch download or otherwise, from back office data store 26, or otherwise.

Illustrated spreadsheet 40 includes a second input section 40b wherein site-level specifics of the goods are provided for each of the sites, here, labelled by way of non-limiting example "Store 1"–"Store 5."Those specifics include current on-hand inventory of the goods at each site, sum of seasonality indices for the goods at each site for the planned selling period, price elasticity of the goods at each site, estimate of base demand for the goods at each site, and current price of the goods at each site. Other embodiments may utilize greater or fewer site-level inputs. As above, values in section 40a may be supplied by the user or operator of work-station 28. They may also be supplied automatically, e.g., by batch download or otherwise, from back office data store 26, or otherwise.

Optimization and output section 40c of spreadsheet 40 utilizes values in the input sections 40a, 40b to determine an optimal allocation of inventory to the retail sites that maximizes chain-wide gross margin. Again, here, the term "chain" refers to any group of retail sites serviced by a common distribution center or centers.

Section 40c comprises cells 42a–42e for storing candidate and final allocations of inventory from the DC to the sites. The values of these cells can be set by the user or otherwise, though, in the illustrated embodiment they are set by optimization tool discussed below.

Cells 44a–44e comprise price markdown functionality that determines, for a given or final allocation to a site (as reflected in cells 42a–42e, respectively), a price markdown that would optimize the gross margin to that site. In the illustrated embodiment, each cell 44a–44e determines the respective price markdown as a function of the candidate allocation, price elasticity of the good at the site, the seasonality of the good at the site and the cost of the good—though fewer or greater input factors may be taken into account.

In the illustrated embodiment, each cell 44a–44e is implemented as an Excel formula, as set forth below, though other programmatic methods could be used instead or in addition:

$$MarkdownPrice = \left(\frac{B \times Seas}{OH + Alloc}\right)^{\frac{1}{Elas}} \times InitP$$

where,

MarkdownPrice is an estimate of the optimal price of the goods at the retail site;

B is the rate of sale of the goods at the initial price;

Seas is a sum of the seasonality indexes for the goods over the planned selling period at the retail site;

OH is the inventory of goods on-hand at the retail site;

Alloc is a quantity of goods in the share (of the total inventory) assigned to the retail site;

Elas is the price elasticity of the goods;

InitP is the initial price of the goods.

Though site-level price elasticities and seasonalities are used in the illustrated embodiment, as noted above, they are not required or used in other practices of the invention. However, as will be evident to those skilled in the art, the inclusion of such elasticities and seasonalities means that practices of the invention that use them can exploit site-level variations in buying behavior. Thus, for example, sites that serve price-insensitive customers can be treated very differently from stores that server price-sensitive shoppers. Other things being equal, this permits capturing incremental margin by diverting merchandise from low-elasticity stores to high-elasticity stores.

Cells 46a–46e of the illustrated embodiment determine the optimal gross margin to each site corresponding to the optimal markdown price and candidate allocation in cells 44a–44e and cells 42a–42e, respectively. In the illustrated embodiment, this is expressed by the following relation:

$$\begin{aligned}
\text{Optimized Gross Margin Per Site} = \\
(\text{OptimizedMarkdown Price} - \text{Cost of Good}) \times \\
(\text{On-Hand Inventory} + \text{Candidate Allocation from DC})
\end{aligned}$$

The relations represented in cells 44a–44e and 46a–46e are essentially a low-over-head shortcut to answering the question of how the optimal markdown price and corresponding per-site gross margin can be estimated as a function of a candidate on-hand inventory level. Those relations can be used to capture the relationship graphically illustrated in FIG. 4. That drawing shows how the optimal gross margin for each retail site varies as a function of the inventory of goods sold by that site.

Figure 4:
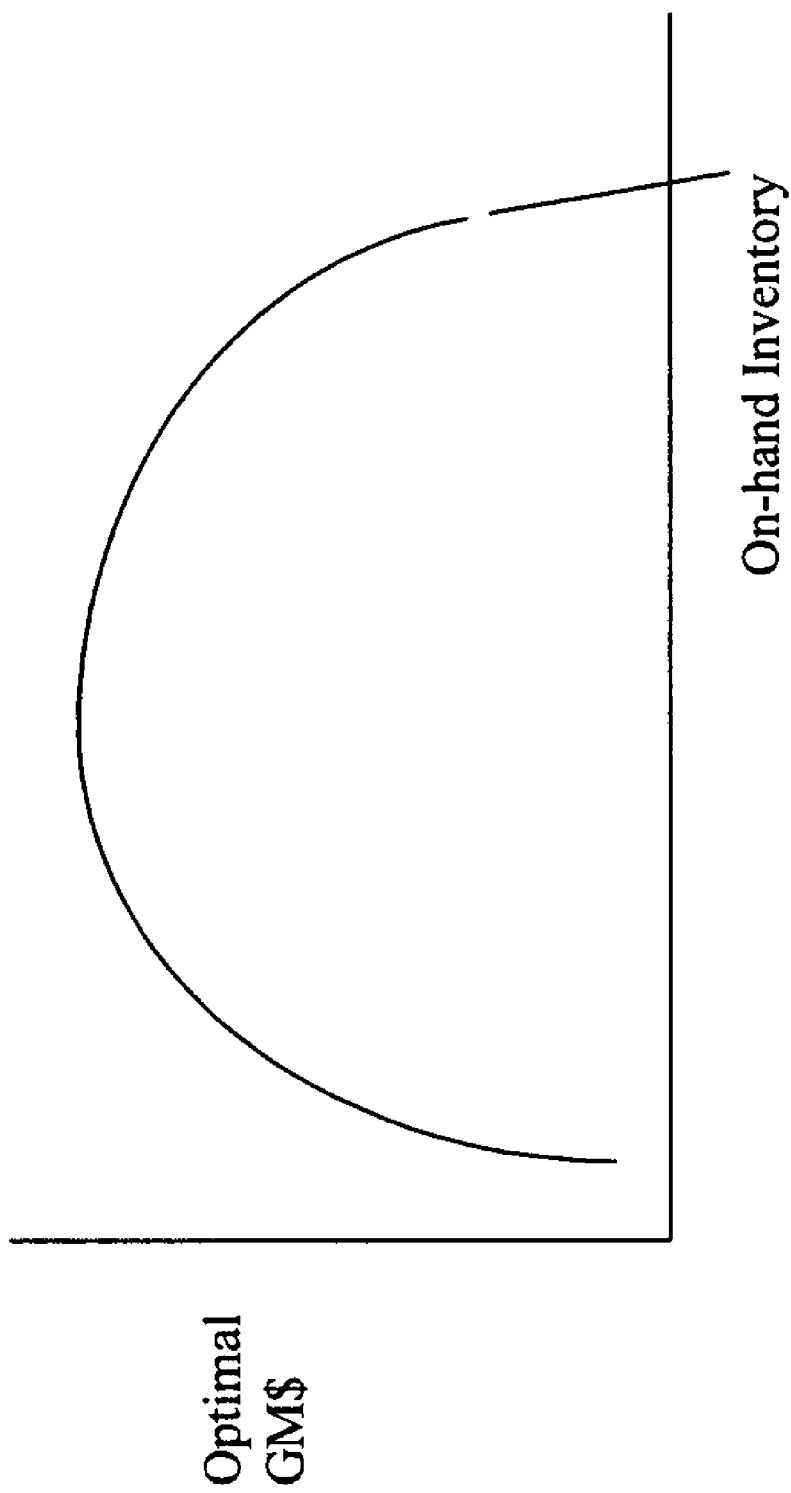
FIG. 4 depicts a relationship between gross margin per site and inventory.
Figure 5:
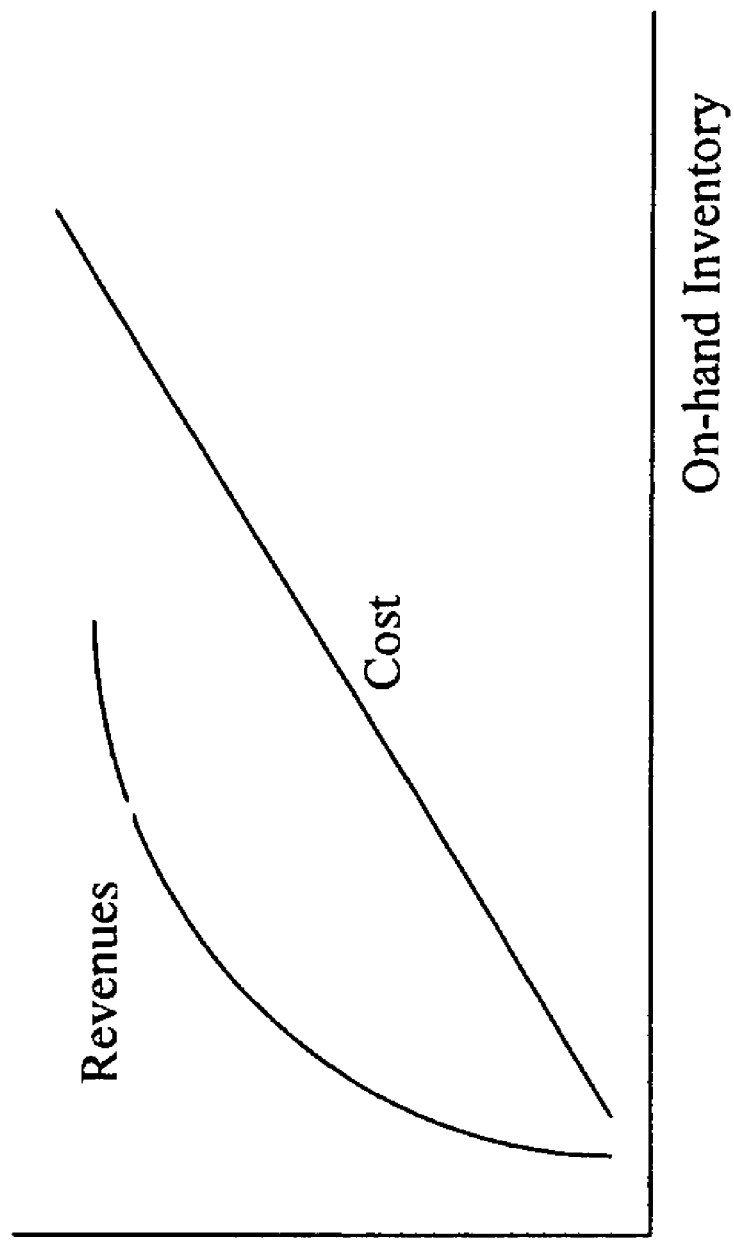
FIG. 5 depicts how optimal revenues and cost of goods sold vary with increasing on-hand inventory at a retail site.

To better understand the curve of FIG. 4, it is useful to look at how optimal revenues and cost of goods sold vary with increasing on-hand inventory. This is shown in FIG. 5. As the on-hand inventory gets bigger and bigger (given a fixed number of weeks in the planned selling period), the optimal markdown must get deeper and deeper to clear the inventory. Assuming a price elasticity greater than one, with every price cut, revenues increase. But as the price gets very small, the incremental increase in revenue is very little so the revenue curve flattens out. On the other hand, as the on-hand inventory gets bigger and bigger, the cost of those goods increases linearly.

Since the gross margin per site is the difference between revenues and cost of goods sold, the optimal gross margin versus inventory curve is the difference between the revenue curve and the cost curve. Intuitively, when the incremental gain in revenue starts to fall below the unit cost, the per site gross margin curve turns down and when the price falls below unit cost, the gross margin curve goes negative.

Cell 48 is a sum of cells 46a–46e and represents the overall chain or enterprise gross margin. In the illustrated embodiment, cell 48 is configured as the target of a general-purpose optimization tool that utilizes a non-linear programming model to simultaneously find the combination of candidate allocations and optimized per-site gross margins, represented by cells 42a–42e and 46a–46e, respectively, which maximizes sum cell 48. This model implicitly considers every possible allocation of DC on-hand inventory to the stores and approximates the optimal site-level markdown recommendations and optimal gross margin for every allocation.

The optimization tool of the illustrated embodiment is the Solver program, which is part of Microsoft Excel, though other optimization tools can be used in addition or instead. Here, Solver is configured to maximize cell 48 by changing the candidate allocations in cells 42a–42e, subject to the constraint that total allocated inventory (i.e., the sum of cells 42a–42e) does not exceed the inventory on-hand at the distribution center and, where applicable, to the constraint that the allocation is of integer (or other valid) allocable quantities of the good from the DC.

The end result of execution of the optimization tool (e.g., Solver) are suggested per-site allocations (stored in cells 42a–42e), suggested optimized price markdowns (stored in cells 44a–44e) and an estimate of the overall, chain-level gross margin attainable by that allocation and pricing. The latter is reflected in cell 48, as shown in the drawing. In the illustrated embodiments, this information is presented in a report, e.g., of the type reflected by spreadsheet 40 of FIG. 2, for use by the chain (or other enterprise) inventory manager or other personnel in allocating inventory and setting prices.

In other embodiments, the allocations and optimized price markdowns generated by the optimization tool are transmitted by workstation 28 to the distribution center workstation 20, e.g., via network 24. The workstation 20 controls automated inventory system 20b, e.g., for automatic picking of goods off shelving in accord with those allocations and placing it on truck 22 (or other delivery mechanisms) for transfer to the retail sites 12–18. This, too, can be governed automatically, e.g., through routing or other control of the distribution mechanisms. Once at those sites, workstation 20 or retail site digital data processors can similarly govern unloading and stocking of the inventory into on-hand shelving (not shown). Simultaneously, workstation 28 can control pricing of the goods at the sites 12–18, e.g., through transmission of price markdown information to the POS terminals, radio frequency identification (RFID) pricing displays and/or or other price indicating mechanisms.

Described above are systems and methods attaining the desired objects. It will be appreciated that the illustrated embodiment is merely an example of the invention and that other embodiments incorporating changes therein fall within the scope of the invention.

In view thereof, what I claim is:

1. In a digital data processing environment, a method of pricing of
   goods by, and allocation of a given inventory of goods to, a plurality of retail sites, the method comprising:
   A. for each of a plurality of candidate allocations of the given inventory among the plurality
   of retail sites, where each candidate allocation comprises assignment of a respective share of the given inventory to each of the plurality of sites, performing the steps of
      (i) estimating an optimal price of the goods at each retail site, which optimal price will return an optimal gross margin to that site in view of its assignment of the respective share of the inventory,
      (ii) determining, for the plurality of sites, the sum of the optimal gross margins determined in step (i),
   B. choosing the candidate allocation that results in a maximum sum of optimal gross margins, C. displaying in a report at least one of
   (i) at least one site's respective share of the candidate allocation of inventory chosen in step (B), and
   (ii) the optimal price associated with at least one site's respective share of the candidate allocation of inventory chosen in step (B).

2. The method of claim 1, wherein step (A) comprises performing steps (A)(i)–(A)(ii) for substantially all possible candidate allocations of the given inventory among the retail sites.

3. The method of claim 1, wherein step (A) includes utilizing an optimization tool that generates the plurality of candidate allocations by varying assignment of respective shares of the given inventory to the plurality of retail sites.

4. The method of claim 3, wherein step (B) includes utilizing the optimization tool to choose the candidate allocation that results in the maximum sum of optimal gross margins.

5. The method of claim 1, wherein step (A)(i) includes taking elasticity of the goods, seasonality of the goods and cost of the goods into account in estimating the optimal price of the goods at each retail site for its respective share of the inventory.

6. The method of claim 5, wherein step (A)(i) includes taking into account inventory on hand, or otherwise previously allocated to, a retail site in estimating the optimal price of the goods at each retail site.

7. The method of claim 6, wherein step (A)(i) includes estimating the optimal price of the goods at each retail site as function of the relation $$MarkdownPrice = \left(\frac{B \times Seas}{OH + Alloc}\right)^{\frac{1}{Elas}} \times InitP$$

where,
  MarkdownPrice is an estimate of the optimal price of the goods at the retail site;
  B is a rate of sale of the goods at an initial price of the goods;
  Seas is a sum of seasonality indexes for the goods over a planned selling period at the retail site;
  OH is an inventory of goods on-hand at the retail site;
  Alloc is a quantity of goods in the respective share assigned to the retail site;
  Elas is a price elasticity of the goods; and
  InitP is the initial price of the goods.

8. In a digital data processing environment, a method of pricing of goods by, and allocation of a given inventory of goods to, a plurality of retail sites, the method comprising
   A. with an optimization tool, performing the steps of
      (i) generating a plurality of candidate allocations of the given inventory among the plurality of retail sites, where each candidate allocation comprises assignment of a respective share of the given inventory to each of the plurality of sites,
      (ii) for each of the plurality of candidate allocations, estimating an optimal price for the goods at each retail site which will return an optimal gross margin to that site in view of its assignment of the respective share of the inventory,
   B. determining, for the plurality of sites, the sum of the optimal gross margins determined in step (A)(i); and
   C. choosing the candidate allocation that results in a maximum sum of optimal gross margins.

9. The method of claim 8, comprising providing functionality for estimating a said optimal price for the goods at a said retail site for a said assignment of a said respective share of the inventory, and invoking that functionality with the optimization tool in order to estimate the said optimal prices for the said retail sites.

10. The method of claim 8, comprising displaying in a report at least one of
   (i) at least one site's respective share of the candidate allocation of inventory chosen in step (B), and
   (ii) the optimal price associated with at least one site's respective share of the candidate allocation of inventory chosen in step (B).

11. The method of claim 8, wherein step (A)(i) comprises generating the plurality of candidate allocations to cover substantially all possible candidate allocations of the given inventory among the retail sites.

12. The method of claim 8, wherein step (B) includes utilizing the optimization tool to choose the candidate allocation that results in the maximum sum of optimal gross margins.

13. The method of claim 8, wherein step (A)(ii) includes estimating the optimal price of the goods at each retail site as function of the relation $$MarkdownPrice = \left(\frac{B \times Seas}{OH + Alloc}\right)^{\frac{1}{Elas}} \times InitP$$

where,
  MarkdownPrice is an estimate of the optimal price of the goods at the retail site;
  B is a rate of sale of the goods at an initial price of the goods;
  Seas is a sum of seasonality indexes for the goods over a planned selling period at the retail site;
  OH is an inventory of goods on-hand at the retail site;
  Alloc is a quantity of goods in the respective share assigned to the retail site;
  Elas is a price elasticity of the goods; and
  InitP is the initial price of the goods.

14. In a digital data processing environment, a method of automated inventory control, the improvement comprising
   A. for each of a plurality of candidate allocations of the given inventory among the plurality of retail sites, where each candidate allocation comprises assignment of a respective share of the given inventory to each of the plurality of sites, performing the steps of
      i. estimating an optimal price of the goods at each retail site, which optimal price will return an optimal gross margin to that site in view of its assignment of the respective share of the inventory,
      ii. determining, for the plurality of sites, the sum of the optimal gross margins determined in step (i),
   B. choosing the candidate allocation that results in a maximum sum of optimal gross margins; and
   C. transmitting an indication of at least one site's respective share of the candidate allocation of inventory chosen in step (B) and/or the optimal price associated therewith for purposes of automatic control of at least one of pricing, picking, distribution, and stocking of the goods with respect to that site.

15. The method of claim 1, wherein step (A) comprises performing steps (A)(i)–(A)(ii) for substantially all possible candidate allocations of the given inventory among the retail sites.

16. The method of claim 14, wherein step (A) includes utilizing an optimization tool that generates the plurality of candidate allocations by varying assignment of respective shares of the given inventory to the plurality of retail sites.

17. The method of claim 16, wherein step (B) includes utilizing the optimization tool to choose the candidate allocation that results in the maximum sum of optimal gross margins.

18. The method of claim 14, wherein step (A)(i) includes taking elasticity of the goods, seasonality of the goods and cost of the goods into account in estimating the optimal price of the goods at each retail site for the respective share of the inventory.

19. The method of claim 18, wherein step (A)(i) includes taking into account inventory on hand, or otherwise previously allocated to, a retail site in estimating the optimal price of the goods at each retail site.

20. The method of claim 19, wherein step (A)(i) includes estimating the optimal price of the goods at each retail site as function of the relation $$MarkdownPrice = \left(\frac{B \times Seas}{OH + Alloc}\right)^{\frac{1}{Elas}} \times InitP$$

where,
MarkdownPrice is an estimate of the optimal price of the goods at the retail site;
B is a rate of sale of the goods at an initial price of the goods;
Seas is a sum of seasonality indexes for the goods over a planned selling period at the retail site;
OH is an inventory of goods on-hand at the retail site;
Alloc is a quantity of goods in the respective share assigned to the retail site;
Elas is a price elasticity of the goods; and
InitP is the initial price of the goods.

21. The method of claim 1, wherein estimating an optimal price of the goods at each retail site comprises:
determining the optimal price of the goods at each retail site based on the relation of a rate of sale of the goods at an initial price of the goods, a sum of seasonality indexes for the goods over a planned selling period at the retail site, an inventory of goods on-hand at the retail site, a cluantity of goods in the respective share assigned to the retail site, a price elasticity of the goods, and the initial price of the goods.

22. The method of claim 8, wherein for each of the plurality of candidate allocations, estimating an optimal price for the goods at each retail site comprises:
determining the optimal price of the goods at each retail site based on the relation of a rate of sale of the goods at an initial price of the goods, a sum of seasonality indexes for the goods over a planned selling period at the retail site, an inventory of goods on-hand at the retail site, a Quantity of goods in the respective share assigned to the retail site, a price elasticity of the goods, and the initial price of the goods.

23. The method of claim 14, wherein estimating an optimal price of the goods at each retail site comprises:
determining the optimal price of the goods at each retail site based on the relation of a rate of sale of the goods at an initial price of the goods, a sum of seasonality indexes for the goods over a planned selling period at the retail site, an inventory of goods on-hand at the retail site, a quantity of goods in the respective share assigned to the retail site, a price elasticity of the goods, and the initial price of the goods.

* * * * *